Dec. 2, 1930.  E. A. BANSCHBACH  1,783,934
PROTECTOR FOR AUTOMOBILES
Original Filed April 1, 1929
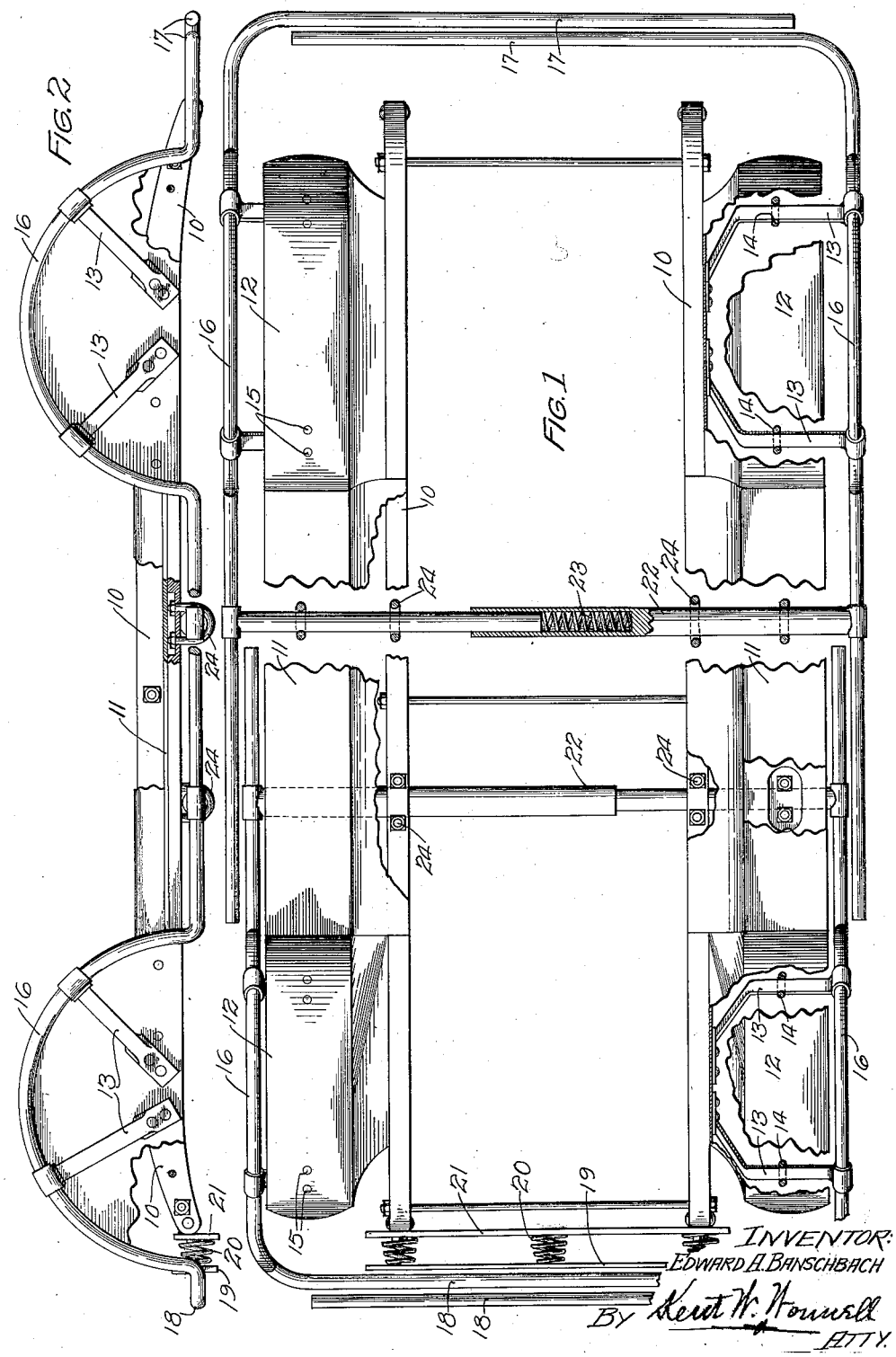

Patented Dec. 2, 1930

1,783,934

UNITED STATES PATENT OFFICE

EDWARD A. BANSCHBACH, OF MADISON, WISCONSIN

PROTECTOR FOR AUTOMOBILES

Application filed April 1, 1929, Serial No. 351,761. Renewed April 21, 1930.

This invention relates to devices for protecting automobiles and other vehicles from injury by accidents and collision and has for its object the provision of mechanism of the class named which shall be of improved construction, efficiency, and operation.

The invention is exemplified in the combination and arrangement of parts shown in the accompanying drawings and described in the following specification, and it is more particularly pointed out in the appended claims.

In the drawings—

Fig. 1 is a top plan view of a portion of an automobile frame with parts broken away showing features of the present invention applied thereto; and Fig. 2 is an elevation of the mechanism shown in Fig. 1.

Heretofore it has been the common practice to provide front and rear bumpers for automobiles to protect the vehicle and its occupants against front and rear collision, but such devices leave the sides of the vehicle unprotected so that there is no safeguard against the most dangerous form of collisions, namely, that which comes from the side. The fenders are also left exposed and since they are commonly made of relatively thin sheet material they are subjected to battering actions which greatly disfigures the appearance of the car.

Referring to the drawings, the numeral 10 designates the side rails of the usual automobile frame which has running boards 11 and fenders 12 connected therewith in the ordinary manner. Secured to the side rails 10 beneath the fenders are brackets 13 which may be in the form of straps of spring steel. Other forms of spring brackets may be employed for this purpose which will readily suggest themselves to those skilled in the art. The brackets 13 may be slidably connected with the fenders 12 by staples 14 riveted to the fenders, as shown at 15.

Supported by the outer ends of the brackets 13 are rods or bars 16 preferably made of spring steel. The rods 16 are shaped to conform to the edges of the fenders and are spaced outwardly a sufficient distance from the fender's edge so that if the bar is struck it will be sprung inwardly until the force of the blow is taken up by the spring brackets 13, thus protecting the fender from concussion.

The front bars 16 have their forward ends bent inwardly to form overlapping front bumper rods 17. In this way a double front bumper is provided of spring material which will protect the forward end of the car. In a similar manner the rear bars 16 are bent inwardly to provide overlapping rear bumpers 18. If desired, a supplemental reinforcement for the rear bumpers 18 may be provided comprising a bar 19 supported by springs 20 and a cross-bar 21 carried on the rear ends of the side rails 10. The rods 16 overlap one another adjacent the edges of the running boards 11 and are supported intermediate the fenders by telescoping cross-bars 22 having springs 23 for pressing the bars outwardly.

The cross-bars 22 may be supported by loops 24 secured to the under face of the running boards and side rails of the car. It will thus be seen that a guard rail is provided entirely surrounding the car and provided with overlapping portions where reinforced protection is desired. Where the fenders are thus guarded it will be possible to use the very lightest sheet material, which may be metal, or the metal fenders may be replaced by other material, such as a frame covered with weather-proofed fabric or other suitable substance.

I claim:

1. The combination with a vehicle, of protector bars detached from each other and arranged adjacent the sides of said vehicle, and spaced outwardly therefrom beyond the fenders and resilient means interposed between said bars and said body.

2. The combination with a vehicle having fenders thereon, of protector bars for said fenders arranged to conform to the contour of said fenders and spaced outwardly therefrom.

3. The combination with a vehicle having fenders at the sides thereof, of protector bars arranged adjacent the edges of said fenders and conforming to the contour thereof, and spring supports mounted on the body of said vehicle for holding said protector bars in spaced relation with the edges of said fenders.

4. The combination with a vehicle, of separate protector bars arranged along the sides thereof and yieldingly supported thereon and having an integral portion thereof extending adjacent one end of said vehicle.

5. The combination with a rectangular shaped vehicle, of a pair of separate protector bars arranged along opposite sides of said vehicle, and yieldingly supported thereon, said bars having portions thereof bent inwardly in position to form a bumper for the end of said vehicle.

6. The combination with a rectangularly shaped vehicle, of a pair of protector bars resiliently supported on said vehicle and arranged in relation adjacent a lateral side of said vehicle.

7. The combination with a rectangularly shaped vehicle, of a pair of protector bars resiliently supported on said vehicle and arranged in overlapping relation adjacent each lateral side of said vehicle, said bars having end portions thereof bent inwardly to form front and rear bumpers for said vehicle.

8. The combination with a vehicle, of a pair of protector bars arranged along the lateral sides of said vehicle adjacent the front thereof, a pair of protector bars arranged along the lateral sides of said vehicle adjacent the rear thereof, said pairs of bars having their end portions extending inwardly adjacent the front and rear ends of said vehicle respectively, and resilient means for holding said bars in spaced relation to the sides of said vehicle to provide a protective rail extending around the entire periphery of said vehicle.

9. The combination with a vehicle having a running board at the sides thereof and a protecting rail adjacent the edge of said running board and spaced outwardly therefrom and extending substantially the full length of the vehicle.

10. The combination with a vehicle having running boards and fenders at the sides thereof, of protecting rails resiliently supported adjacent the edges of said running boards and fenders in spaced relation thereto.

11. The combination with a vehicle, of protecting rails arranged at opposite sides of said vehicle, and a resiliently compressible member connecting said rails.

12. The combination with a vehicle having fenders at the sides thereof, of protecting rails arranged adjacent said fenders, compressible strut members extending transversely of said vehicle and connecting said rails, and resilient brackets carried by said vehicle for supporting said rails.

13. The combination with a vehicle, of laterally arranged protecting rails therefor, said rails having rigidly attached portions thereof extending adjacent the end of said vehicle to form a bumper, and supplemental resilient reinforcements for said bumper, and laterally arranged rails at opposite sides of said vehicle being separate from each other.

14. The combination with a vehicle having rear fenders, of protecting rails extending adjacent the lateral edges of said fenders, said rails having the rear portions thereof extending inwardly in the rear of said vehicle and in overlapping relation with one another to form a rear bumper, and supplemental resilient reinforcing means for said bumper secured to the frame of said vehicle.

15. The combination with a vehicle body having laterally positioned running boards and fenders, of front and rear protecting rails at each side of said vehicle and spaced outwardly from the edges of said running boards and fenders, the rails at each side of said vehicle being arranged in overlapping relation to one another, resiliently telescoping strut members extending transversely beneath said vehicle and secured to the rails at opposite sides of said vehicle, and resilient bracket members secured to the frame of said vehicle, and connected with said protecting rails, said protecting rails being bent inwardly adjacent the front and rear of said vehicle to form front and rear bumpers therefor.

16. The combination with a motor vehicle substantially rectangular in shape and having foot boards at the sides thereof, of a guard therefor extending around substantially the entire vehicle and supported from the chassis thereof, said guard being formed in separate sections movable relative to each other.

17. The combination with a motor vehicle, of a guard therefor extending around substantially the entire vehicle, and bent at the corners to provide end and side pieces continuous with one another, the corner portions of said guard with their attached end and side pieces being movable relatively to one another.

18. The combination with a motor vehicle, of a guard extending substantially entirely around the vehicle, said guard comprising corner members bent to form side and end pieces continuous with one another, said corner members overlapping at the sides and ends of said vehicle.

19. The combination with a motor vehicle, of a guard extending around substantially the entire vehicle and supported from the chassis thereof, said guard having portions thereof registering with the wheels of said vehicle bent upwardly to conform substantially to the contour of said wheels.

20. The combination with a motor vehicle substantially rectangular in shape, of a guard extending substantially entirely around the vehicle, and means for resiliently supporting said guard from the chassis of said vehicle, said guard having substantially straight portions to conform to the outline of said vehicle and being found in separate relatively movable sections.

21. The combination with a motor vehicle, of a guard extending substantially entirely around said vehicle and comprising continuous portions extending around the corners of said vehicle, said portions overlapping one another at the sides and rear of said vehicle, and resilient means for supporting said guard from the chassis of said vehicle, the side members of said guard having bent portions approximately conforming to the contour of the wheels of said vehicle.

22. The combination with a motor vehicle having fenders at the sides thereof, of a yielding guard extending substantially entirely around said vehicle and having portions at the sides thereof conforming to the contour of said fenders.

23. The combination with a motor vehicle, of a yielding guard extending substantially entirely around said vehicle and having continuous portions at the corners thereof, the side portions of said guard having upwardly bent portions conforming substantially to the upper portion of the periphery of the wheels of said vehicle.

24. The combination with a vehicle having a running board and fenders, of a side bumper secured to the running board and following the contour of the fenders.

25. The combination with a vehicle having running boards and fenders, of side bumpers disposed adjacent said running boards and fenders, said bumpers extending from the frame of said vehicle and a cross brace connecting the bumpers at opposite sides of said vehicle.

26. The combination with an elongated rectangularly shaped vehicle, of a yielding shock-absorbing frame surrounding said vehicle and spaced outwardly therefrom beyond the sides and ends of said vehicle, said frame being formed in separate relatively movable sections.

27. A collision obstructing guardrail divertable under impact from normal position toward the vehicle and restorable to normal position, said guardrail having portions thereof disposed adjacent all four sides of said vehicle and spaced apart and beyond the outer sides of the frame and body of said vehicle, said guardrail having separate relatively movable portions disposed at opposite sides of the vehicle.

28. The combination with a vehicle having fenders thereon, of a horizontal bumper extending across the vehicle, a bumper for the side of said vehicle secured to said fenders and supporting said cross bumper.

29. The combination with a vehicle having side fenders, of a horizontal bumper across the end of the vehicle and a longitudinal bumper supporting said cross bumper and attached to said fenders, said longitudinal bumper being attached to and extending from the frame.

EDWARD A. BANSCHBACH.